US012720356B2

(12) United States Patent
Yang et al.

(10) Patent No.: US 12,720,356 B2
(45) Date of Patent: Aug. 25, 2026

(54) SIGNAL MEASUREMENT DIFFERENCE REPORTING

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 18/615,996

(22) Filed: Mar. 25, 2024

(65) Prior Publication Data

US 2025/0301351 A1 Sep. 25, 2025

(51) Int. Cl.
*H04W 24/10* (2009.01)
*H04W 24/08* (2009.01)

(52) U.S. Cl.
CPC .......... *H04W 24/10* (2013.01); *H04W 24/08* (2013.01)

(58) Field of Classification Search
CPC . H04W 24/10; H04W 24/08; H04W 36/0088; H04L 5/0048; H04L 5/0057
See application file for complete search history.

(56) References Cited

U.S. PATENT DOCUMENTS

2012/0176965 A1* 7/2012 Zhu ...................... H04L 5/0023 370/328
2014/0098690 A1* 4/2014 Siomina ................ H04W 24/08 370/252
2018/0213594 A1* 7/2018 You ...................... H04W 88/06
2021/0085517 A1* 3/2021 Lee ........................ A61F 7/00
2021/0320700 A1* 10/2021 Nam .................... H04W 76/28
2021/0359806 A1* 11/2021 Levitsky ............... H04L 5/0048
2021/0360436 A1* 11/2021 Jassal .................... H04W 16/28
2021/0376898 A1* 12/2021 Levitsky ............... H04W 24/10
2022/0006539 A1* 1/2022 Sun ........................ H04B 17/24
2022/0104147 A1* 3/2022 Cui ..................... H04W 52/243
2022/0116898 A1* 4/2022 Ying ................. H04W 56/0005
2022/0131676 A1* 4/2022 Zhang .................. H04L 5/0048
2022/0132344 A1* 4/2022 Zhou ....................... H04W 4/70
2022/0141694 A1* 5/2022 Miao .................... H04B 17/345 370/252
2022/0163614 A1* 5/2022 Wong .................... H04W 4/029
2022/0190939 A1* 6/2022 Zhang .................. H04B 17/336
2022/0201519 A1* 6/2022 Huang ................. H04B 17/309
2023/0057169 A1* 2/2023 Li ........................ H04B 7/0626
(Continued)

*Primary Examiner* — Dady Chery
(74) *Attorney, Agent, or Firm* — Holland & Hart LLP

(57) ABSTRACT

This disclosure provides methods, components, devices and systems for signal measurement difference reporting. A user equipment (UE) may report, to a network entity, a measurement difference, or a difference between measurements of multiple reference signals, based on a capability of the UE and a configuration from the network entity. The UE may transmit a report that indicates the measurement difference based on the configuration. Based on the report that indicates the difference between the signal measurements, the UE may receive a downlink grant that indicates an adjustment to a modulation and coding scheme for physical downlink shared channel transmission, or an adjustment to a quantity of layers to use for physical downlink shared channel transmission, or both.

20 Claims, 11 Drawing Sheets

(56) References Cited

U.S. PATENT DOCUMENTS

| | | | | | |
|---|---|---|---|---|---|
| 2023/0107840 | A1* | 4/2023 | Bai | H04L 5/005 | |
| | | | | 370/329 | |
| 2023/0228837 | A1* | 7/2023 | Kazmi | G01S 5/021 | |
| | | | | 455/456.1 | |
| 2023/0247461 | A1* | 8/2023 | Zhu | H04W 24/10 | |
| | | | | 455/422.1 | |
| 2023/0276373 | A1* | 8/2023 | Chen | H04L 5/0051 | |
| | | | | 370/318 | |
| 2023/0403107 | A1* | 12/2023 | Soltani | H04L 5/0057 | |
| 2023/0413130 | A1* | 12/2023 | Zhou | H04W 36/0058 | |
| 2024/0085517 | A1* | 3/2024 | Duan | H04W 4/026 | |
| 2024/0098533 | A1* | 3/2024 | Leng | H04W 24/02 | |
| 2024/0098566 | A1* | 3/2024 | Gemelli | H04W 28/086 | |
| 2024/0195553 | A1* | 6/2024 | Manolakos | H04L 5/0091 | |
| 2024/0196242 | A1* | 6/2024 | Ku | H04W 24/10 | |
| 2024/0235704 | A1* | 7/2024 | Sanguanpuak | H04B 17/3913 | |
| 2024/0340918 | A1* | 10/2024 | Chou | H04L 5/0051 | |

* cited by examiner

200

400

600

SIGNAL MEASUREMENT DIFFERENCE REPORTING

TECHNICAL FIELD

The following relates to wireless communications, including signal measurement difference reporting.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support signal measurement difference reporting. For example, the described techniques provide for a user equipment (UE) to report, to a network entity, a measurement difference between multiple signals based on a capability of the UE and a configuration from the network entity. For example, the UE may transmit capability signaling that indicates that the wireless device supports measuring multiple reference signals and reporting a difference between signal measurements corresponding to the multiple reference signals. The multiple reference signals may be channel state information (CSI) reference signals (CSI-RSs), demodulation reference signals (DMRSs), or a combination thereof. In some cases, the signal measurements may be spectral efficiencies or signal-to-interference-and-noise ratios (SINRs) of the multiple reference signals. The UE may receive, based on the capability signaling, configuration signaling that enables reporting the difference between the signal measurements. In some cases, the configuration signaling may further indicate a threshold measurement difference and a threshold time duration that are both associated with reporting the difference between the signal measurements. The UE may thus transmit, to the network entity and based on the difference between the signal measurements satisfying the threshold measurement difference for a time duration that satisfies the threshold time duration, a report that indicates the difference between the signal measurements.

A method for wireless communications by a wireless device is described. The method may include transmitting capability signaling that indicates that the wireless device supports measuring a set of multiple signals and reporting a difference between signal measurements corresponding to the set of multiple signals, receiving, based on the capability signaling, configuration signaling that enables reporting the difference between the signal measurements, the configuration signaling further indicating a threshold measurement difference and a threshold time duration that are both associated with reporting the difference between the signal measurements, and transmitting, based on the difference between the signal measurements satisfying the threshold measurement difference for a time duration that satisfies the threshold time duration, a report that indicates the difference between the signal measurements.

A wireless device for wireless communications is described. The wireless device may include one or more memories storing processor executable code, and one or more processors coupled with the one or more memories. The one or more processors may individually or collectively be operable to execute the code to cause the wireless device to transmit capability signaling that indicates that the wireless device supports measuring a set of multiple signals and reporting a difference between signal measurements corresponding to the set of multiple signals, receive, based on the capability signaling, configuration signaling that enables reporting the difference between the signal measurements, the configuration signaling further indicating a threshold measurement difference and a threshold time duration that are both associated with reporting the difference between the signal measurements, and transmit, based on the difference between the signal measurements satisfying the threshold measurement difference for a time duration that satisfies the threshold time duration, a report that indicates the difference between the signal measurements.

Another wireless device for wireless communications is described. The wireless device may include means for transmitting capability signaling that indicates that the wireless device supports measuring a set of multiple signals and reporting a difference between signal measurements corresponding to the set of multiple signals, means for receiving, based on the capability signaling, configuration signaling that enables reporting the difference between the signal measurements, the configuration signaling further indicating a threshold measurement difference and a threshold time duration that are both associated with reporting the difference between the signal measurements, and means for transmitting, based on the difference between the signal measurements satisfying the threshold measurement difference for a time duration that satisfies the threshold time duration, a report that indicates the difference between the signal measurements.

A non-transitory computer-readable medium storing code for wireless communications is described. The code may include instructions executable by one or more processors to transmit capability signaling that indicates that the wireless device supports measuring a set of multiple signals and reporting a difference between signal measurements corresponding to the set of multiple signals, receive, based on the capability signaling, configuration signaling that enables reporting the difference between the signal measurements, the configuration signaling further indicating a threshold measurement difference and a threshold time duration that are both associated with reporting the difference between the signal measurements, and transmit, based on the difference between the signal measurements satisfying the threshold measurement difference for a time duration that satisfies the threshold time duration, a report that indicates the difference between the signal measurements.

Some examples of the method, wireless devices, and non-transitory computer-readable medium described herein may further include operations, features, means, or instructions for transmitting a set of multiple reports, each indicating a respective difference between respective signal measurements, in accordance with a periodicity that may be based on the configuration signaling.

Some examples of the method, wireless devices, and non-transitory computer-readable medium described herein may further include operations, features, means, or instructions for receiving, based on a physical downlink shared channel (PDSCH) block error rate (BLER) satisfying a BLER threshold, a downlink control information (DCI) message that indicates that the wireless device may be to report the difference between the signal measurements, where transmitting the report may be further based on the DCI message.

Some examples of the method, wireless devices, and non-transitory computer-readable medium described herein may further include operations, features, means, or instructions for receiving, based on the report that indicates the difference between the signal measurements, a downlink grant that indicates an adjustment to a modulation and coding scheme (MCS) for PDSCH transmission, or an adjustment to a quantity of layers to use for PDSCH transmission, or both.

In some examples of the method, wireless devices, and non-transitory computer-readable medium described herein, transmitting the report may include operations, features, means, or instructions for transmitting the report that includes a field of one or more bits for indicating the difference between the signal measurements.

In some examples of the method, wireless devices, and non-transitory computer-readable medium described herein, transmitting the report may include operations, features, means, or instructions for transmitting the report via a CSI message and via a physical uplink control channel (PUCCH) or a physical uplink shared channel (PUSCH).

In some examples of the method, wireless devices, and non-transitory computer-readable medium described herein, transmitting the report may include operations, features, means, or instructions for transmitting the report using a medium access control-control element (MAC-CE) via a PUSCH.

In some examples of the method, wireless devices, and non-transitory computer-readable medium described herein, receiving the configuration signaling may include operations, features, means, or instructions for receiving a radio resource control reconfiguration message.

In some examples of the method, wireless devices, and non-transitory computer-readable medium described herein, the set of multiple signals include a DMRS of a PDSCH, or a CSI-RS, or a combination thereof.

In some examples of the method, wireless devices, and non-transitory computer-readable medium described herein, the signal measurements include an SINR, a spectral efficiency value, or both.

DETAILED DESCRIPTION

Figure 1:
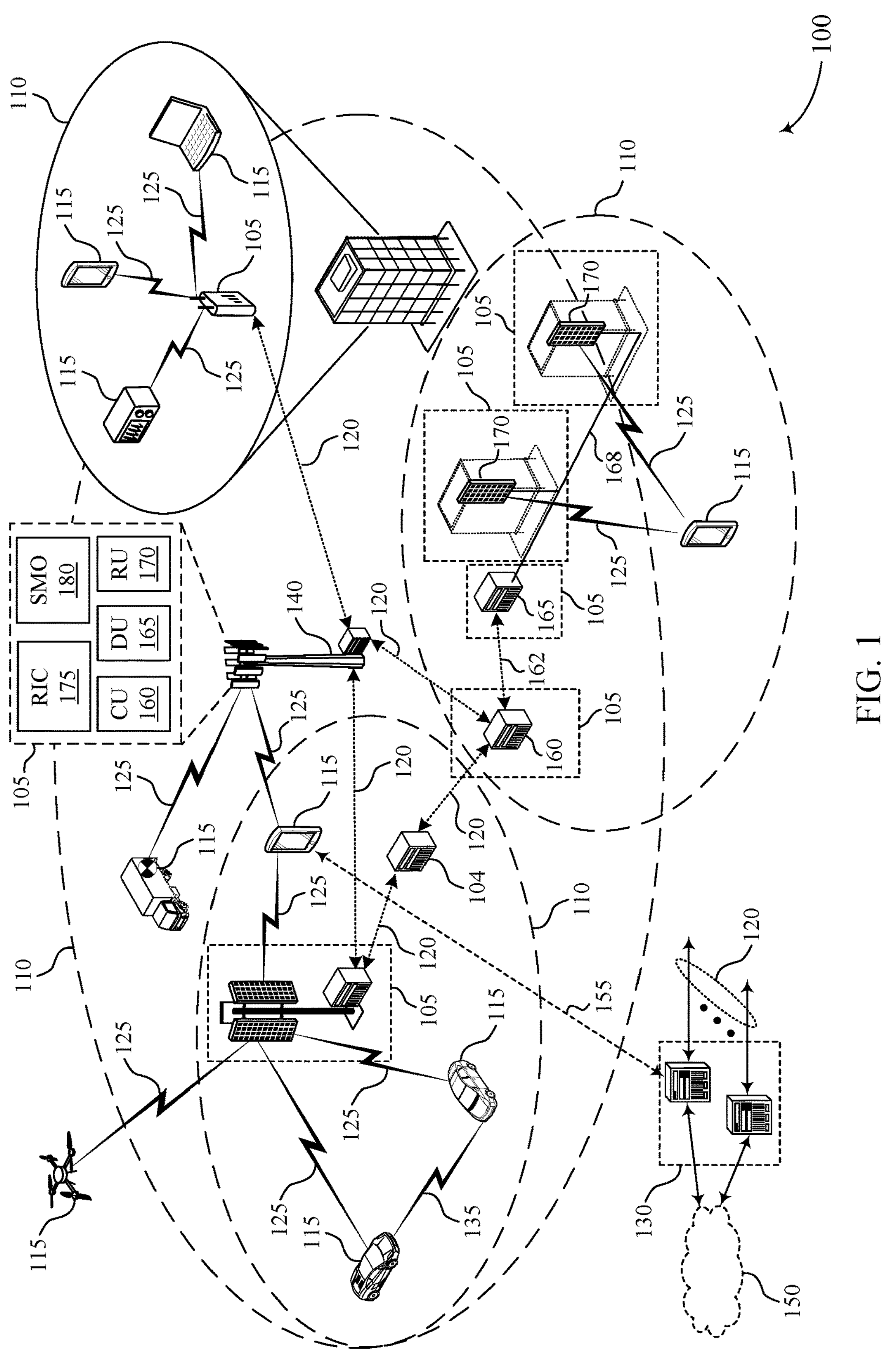
FIG. 1 shows an example of a wireless communications system that supports signal measurement difference reporting in accordance with one or more aspects of the present disclosure.

In wireless communications, a user equipment (UE) may receive one or more reference signals such as a channel state information (CSI) reference signal (CSI-RS), a demodulation reference signal (DMRS), or both. In some cases, the UE may use the one or more reference signals in a beamforming procedure (such as constant modulus (CM) beamforming). For example, the UE may measure the one or more reference signals to determine and report, to a network entity, one or more channel metrics such as a channel quality indicator (CQI). The network entity may perform beamforming using the one or more channel metrics from the UE. Further, the network entity may determine a set of parameters for the UE to use for uplink transmission and downlink reception based on the one or more channel metrics. However, in some cases, relatively large differences in interference between reference signals (e.g., between a CSI-RS and a DMRS) may cause the UE to fail to decode one or more signals (such as the DMRS), resulting in inefficiencies such as data loss and throughput degradation.

Various aspects relate generally to signal measurement difference reporting. Some aspects more specifically relate to a UE that may report, to a network entity, a measurement difference between multiple signals based on a capability of the UE and a configuration from the network entity. In some cases, the UE may transmit capability signaling that indicates that the UE supports measuring multiple signals. For example, the multiple signals may include CSI-RS, a DMRS, or both. In some examples, the capability signaling may indicate that the UE supports reporting a difference between signal measurements corresponding to the multiple signals. The UE may receive, based on the capability signaling, configuration signaling that enables reporting the difference between the signal measurements. In some cases, the configuration signaling may further indicate a threshold measurement difference and a threshold time duration that are both associated with reporting the difference between the signal measurements. The UE may measure the multiple signals to obtain the signal measurements, which may include a signal-to-interference-and-noise ratio (SINR) corresponding to each signal, a spectral efficiency corresponding to each signal, or both. The UE may transmit, based on the difference between the signal measurements satisfying the threshold measurement difference for a time duration that satisfies the threshold time duration, a report that indicates the difference between the signal measurements (e.g., via one or more bits in a CSI message). It is noted that, as described herein, spectral efficiency may be referred to as spectrum efficiency or bandwidth efficiency.

In some cases, the UE may transmit one or more reports periodically. In some other cases, the UE may transmit the one or more reports without respect to a period (e.g., aperiodic). For example, the UE may report the difference between the signal measurements in response to a downlink control information (DCI) message received (e.g., due to a relatively high BLER detected at the network entity). In some implementations, the network entity may determine and report one or more communication parameters for the UE to use based on the difference between the signal measurements. For example, the UE may receive a message from the network entity that indicates a modulation and coding scheme (MCS), a quantity of layers to use for uplink transmission, or both.

Particular aspects of the subject matter described in this disclosure can be implemented to realize one or more of the following potential advantages. In some examples, by reporting the signal measurement difference, the described techniques can be used by a UE to improve throughput, increase data transfer rates, and decrease latency in wireless communications. Further, by reporting one or more communication parameters for the UE to use based on the difference between the signal measurements, the described techniques can be used to avoid relatively high BLER on one or more channels, thus improving the user experience.

Aspects of the disclosure are initially described in the context of wireless communications systems. Aspects of the disclosure are then described with reference to a process flow. Aspects of the disclosure are further illustrated by and described with reference to apparatus diagrams, system diagrams, and flowcharts that relate to signal measurement difference reporting.

FIG. 1 shows an example of a wireless communications system 100 that supports signal measurement difference reporting in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems, a UE may receive, from a network entity, a CSI-RS, which the UE may use to measure and obtain a channel measurement. The UE may transmit a report to the network entity, the report indicating a CQI based on the channel measurement. Then, the network entity may schedule and transmit, based on the CQI, a DMRS via a physical downlink shared channel (PDSCH).

The UE may use a resource set within a resource setting for measurement for a particular CSI report (e.g., to report the channel measurement based on the CSI-RS). For example, a periodic or semi-persistent CSI report may include a single resource set. Similarly, a UE may select a single resource set for an aperiodic CSI report. The UE may use a selected resource set in accordance with a CSI report configuration. For example, the CSI report configuration may be an example of channel measurement resource (CMR) configuration (e.g., a non-zero power (NZP) CSI-RS resource configuration for channel measurement). Additionally or alternatively, the CSI report configuration may be an example of an interference measurement resource (IMR) configuration (e.g., a zero power (ZP) CSI-RS resource configuration for interference measurement (CSI-IM) or a non-zero power CSI-RS Resource configuration for interference measurement). In some examples, the CSI report configuration may be an example of a codebook configuration. The codebook configuration may have a codebook type (e.g., typeI-SinglePanel, typeI-MultiPanel, typeII), a rank indicator (RI) restriction, or both. In some cases, the CSI report configuration may have or correspond to a report configuration type (e.g., periodic, semi-persistent, aperiodic). In some examples, each CMR configuration of a set of CMR configurations (e.g., NZP CMR resource a1, NZP CMR resource a2) may be associated with each IMR configuration within a set of IMR configurations (e.g., CSI-IM resource b1, CSI-IM resource b2, NZP IMR resource c1, NZP IMR resource c2, or any combination thereof). The UE may thus select a CSI report configuration based on an indication from the network entity, one or more reference signals, or any combination thereof. In some cases, field bit widths for a unit such as an RI, a CQI, a layer indicator (LI), or a CSI-RS resource indicator (CRI) having a particular codebook type (e.g., typeI-SinglePanel) or a report quantity set to a corresponding value (e.g., cri-RI-CQI) may each be based on a quantity of antenna ports.

However, in some cases, a first interference of a channel corresponding to the CSI-RS and a second interference of a channel (e.g., PDSCH) corresponding to the DMRS may be different due to various circumstances. For example, beamforming factors such as beam direction and beam width may be different among a set of signals (e.g., the CSI-RS and the DMRS) due to different beamforming implementations (e.g., due to different infrastructure vendor implementations). That is, because each signal of the set of signals may not be transmitted on a same beam, the UE may receive each signal with a different interference. Further, the UE may receive each signal in a different downlink slot, causing differences in interference. In some cases, different implementations (e.g., corresponding to different vendor implementations) may include different methods for inter-cell interference coordination (ICIC). Further, the second interference (e.g., corresponding to the PDSCH DMRS) may be greater than the first interference (e.g., corresponding to the CSI-RS) due to different MIMO configurations (e.g., MU-MIMO or SU-MIMO) for CM beamforming.

These differences in interference (e.g., between the first interference and the second interference) may result in a relatively high signal measurement difference (e.g., a high observable SINR difference, a spectral efficiency difference) between the DMRS and the CSI-RS. In some cases, the UE may drop (e.g., refrain from decoding) the PDSCH DMRS due to interference. Even so, in such cases, the UE may report a relatively high CQI (e.g., with a same rank) based on an SINR or spectral efficiency of the CSI-RS (e.g., having less interference). This may result in a relatively high block error rate (BLER). For example, the network entity, the UE, or both may detect a BLER that is above a BLER threshold (e.g., 100% BLER) on a PDSCH for a relatively high time duration (e.g., a few hundreds of milliseconds) due to relatively slow outer loop link adaptation at the UE, the network entity, or both.

In some cases, these differences in interference may negatively impact reception at the UE. For example, if the second interference (e.g., for the DMRS) is greater than the first interference (e.g., for the CSI-RS), the UE may fail to decode one or more messages, such as the DMRS, from the network entity. This may result in data loss, increased latency, and throughput degradation, diminishing the user experience (e.g., due to reduced mean opinion score (MoS) of voice over NR, including voice muting). Thus, solutions that allow a UE to report differences in interference between signals are desirable.

In the wireless communications system 100, a UE 115 may report, to a network entity 105, a measurement difference between multiple signals based on a capability of the UE 115 and a configuration from the network entity 105. For example, the UE 115 may transmit capability signaling that indicates that the wireless device supports measuring multiple signals (e.g., including a CSI-RS and a PDSCH DMRS) and reporting a difference between signal measurements corresponding to the multiple signals. In some cases, the signal measurements may be spectral efficiencies or SINRs of the multiple signals. The UE 115 may receive, based on the capability signaling, configuration signaling that enables reporting the difference between the signal measurements. In some cases, the configuration signaling may further indicate a threshold measurement difference and a threshold time duration that are both associated with reporting the difference between the signal measurements. The UE 115 may thus transmit, to the network entity 105 and based on the difference between the signal measurements satisfying the threshold measurement difference for a time duration that satisfies the threshold time duration, a report that indicates the difference between the signal measurements (e.g., via one or more bits in a CSI message). In some cases, the UE 115 may transmit the reports periodically or the reports may be aperiodic (e.g., in response to a DCI message received due to a relatively high BLER). Thus, the UE 115 may report signal measurement differences to improve throughput, data transfer, and reduce latency in wireless communications.

Figure 2:
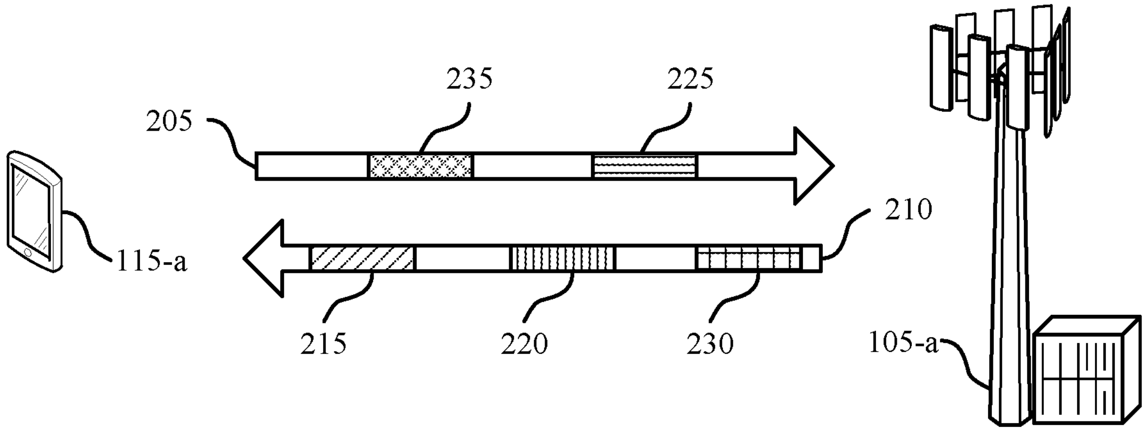
FIG. 2 shows an example of a wireless communications system that supports signal measurement difference reporting in accordance with one or more aspects of the present disclosure.
Figure 2:
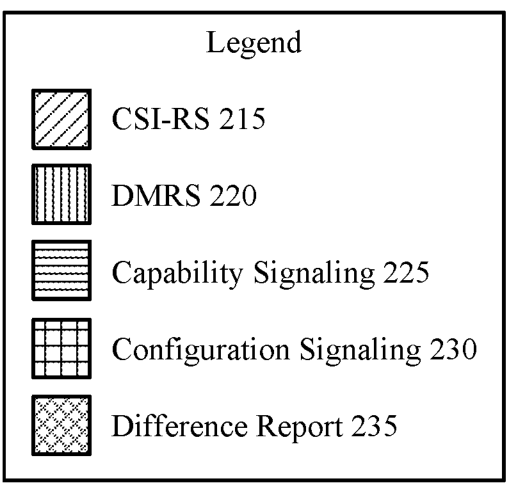

FIG. 2 shows an example of a wireless communications system 200 that supports signal measurement difference reporting in accordance with one or more aspects of the present disclosure. In some cases, the wireless communications system 200 may implement or be implemented by aspects of the wireless communications system 100. For example, the wireless communications system 200 may include one or more UEs 115 (e.g., a UE 115-*a*) and one or more network entities 105 (e.g., a network entity 105-*a*), which may be examples of the corresponding devices as described herein. The UE 115-*a* may transmit, to the network entity 105-*a*, one or more uplink messages via an uplink connection 205, which may include one or more uplink channels. Similarly, the network entity 105-*a* may transmit, to the UE 115-*a*, one or more downlink messages via a downlink connection 210, which may include one or more downlink channels.

In some implementations, the UE 115-*a* may receive one or more reference signals from the network entity 105-*a*. For example, the UE 115-*a* may receive a CSI-RS 215. Additionally or alternatively, the UE 115-*a* may receive a DMRS 220 via PDSCH. The UE 115-*a* may measure the one or more reference signals to obtain a set of signal measurements. For example, the set of signal measurements may include an SINR, a spectral efficiency, a CQI, or any combination thereof corresponding to each of the one or more reference signals. In the following description of the operations between the UE 115-*a* and the network entity 105-*a*, although the one or more reference signals are referred to as a CSI-RS 215 and a DMRS 220 for simplicity, the techniques described herein may be applied to other reference signals received at the UE 115-*a*.

In some cases, the UE 115-*a* may transmit capability signaling 225 to the network entity 105-*a*. The capability signaling 225 may include (e.g., define) a UE capability for reporting a signal measurement difference. The signal measurement difference may be a difference between respective SINRs corresponding to the one or more reference signals, a difference between respective spectral efficiencies corresponding to the one or more reference signals, or both. Thus, the UE 115-*a* may indicate, to the network entity 105-*a*, a capability of the UE to report the signal measurement difference. In some cases, the signal measurement difference may be an example of a difference between the channel metrics corresponding to respective channels used to transmit the CSI-RS 215 and the DMRS 220. That is, the signal measurement difference may refer to a channel measurement difference, a signal metric difference, or a channel metric difference.

In some implementations, the network entity 105-*a* may transmit configuration signaling 230 to the UE 115-*a* in response to, or based on, the capability signaling 225. The configuration signaling 230 may enable a report of the signal measurement difference (or multiple reports of respective signal measurement differences) at the UE 115-*a*. Additionally or alternatively, the configuration signaling 230 may include a configuration (or a reconfiguration) for reporting the signal measurement difference. For example, the configuration signaling 230 may include an indication of a threshold measurement difference, a threshold time duration, or both. The configuration signaling 230 may additionally or alternatively include an indication of one or more timers for the UE 115-*a* to trigger based on the signal measurement difference satisfying (e.g., exceeding) the threshold measurement difference. In some cases, the configuration signaling 230 may indicate a periodicity (e.g., a time interval or an indication of how frequently to transmit the signal measurement difference). In such cases, the configuration signaling 230 may indicate that the UE 115-*a* is to transmit the signal measurement difference according to the periodicity.

The UE 115-*a* may measure the one or more reference signals to obtain multiple signal measurements. The multiple signal measurements may include a first SINR value corresponding to the CSI-RS 215, a second SINR value corresponding to the DMRS 220 (e.g., PDSCH DMRS), a first spectral efficiency value corresponding to the CSI-RS 215, a second spectral efficiency value corresponding to the DMRS 220, or any combination thereof. In some cases, the UE may determine the signal measurement difference based on the multiple signal measurements. For example, the signal measurement difference may take a value, measured at the UE 115-*a*, corresponding to a difference between the first SINR value and the second SINR value, a difference between the first spectrum efficiency value and the second spectrum efficiency value, a difference between other channel metric or signal measurement values, or any combination thereof.

The UE 115-*a* may determine whether the signal measurement difference satisfies (e.g., exceeds) the threshold measurement difference for at least a time duration that satisfies (e.g., exceeds) the threshold time duration. In some cases, after the UE 115-*a* determines that the signal measurement difference exceeds the threshold measurement difference at a first time, the UE 115-*a* may initiate (e.g., trigger or begin) one or more timers associated with the threshold time duration and the threshold measurement difference. In some cases, the UE 115-*a* may accordingly select a timer to use based on the value of the signal measurement difference. For example, for a first signal measurement difference that exceeds a first threshold, the UE 115-*a* may select a first timer corresponding to the first threshold. For a second signal measurement difference that exceeds the first threshold and a second threshold, the UE 115-*a* may select a second timer corresponding to the second threshold. In some examples, the second timer may correspond to a shorter duration than the first timer (e.g., the second timer may expire in a shorter duration than the first timer when initiated at a same time). In some cases, the UE 115-*a* may use a selected timer to determine whether the time duration satisfies the threshold time duration. If the UE 115-*a* determines that the signal measurement difference is above the signal measurement threshold for the time duration that satisfies the threshold time duration, the UE 115-*a* may determine to report the signal measurement difference (or an indication thereof). For example, the UE 115-*a* may report the signal measurement difference in a difference report 235.

The UE 115-*a* may transmit, to the network entity 105-*a*, the difference report 235. In some cases, the difference report 235 may be an example of an uplink CSI message. The difference report 235 may include an indication of the signal measurement difference. In some cases, the UE 115-*a* may transmit the difference report 235 via an uplink medium access control-control element (MAC-CE) on a physical uplink shared channel (PUSCH). For example, the UE 115-*a* may transmit the difference report 235 via uplink prescheduling signaling or via a scheduling request for an uplink grant. In some implementations, the UE 115-*a* may transmit the difference report 235 according to a periodicity (e.g., transmitting the signal measurement difference periodically, periodic CSI (P-CSI) reports) based on the configuration signaling 230. Additionally or alternatively, the UE 115-*a* may transmit the difference report 235 without respect to a periodicity (e.g., aperiodic CSI (A-CSI) reports). For example, if the network entity 105-*a* determines that a BLER associated with the UE 115-*a* satisfies (e.g., exceeds) a threshold BLER, the network entity 105-*a* may transmit a DCI message (e.g., via the downlink connection 210) indicating that the UE 115-*a* is to transmit an aperiodic difference report (e.g., a current or instantaneous difference, a statistical difference, such as an average observed over a time duration, or the like). Accordingly, the UE 115-*a* may determine and transmit a signal measurement difference, as described herein, via the aperiodic difference report. In some examples, the UE 115-*a* may transmit the difference report 235 (periodic or aperiodic) in a field of one or more bits (e.g., extra bits). For example, the UE 115-*a* may use a set of four bits to indicate the signal measurement difference to the network entity 105-*a*.

In some implementations, the network entity 105-*a* may use the difference report 235 (e.g., the signal measurement difference value) to determine one or more parameters for the UE 115-*a* to use for uplink transmission or downlink reception, such as an MCS (e.g., to maintain or adjust an MCS level for a subsequent transmission), a MIMO Layer (e.g., to maintain or adjust a quantity of MIMO layers for a subsequent transmission), a quantity transport blocks (TBs), or any combination thereof. The UE 115-*a* may receive an indication of the one or more parameters and may transmit or receive one or more messages using the one or more parameters to reduce BLER on a channel (e.g., to avoid a relatively high BLER on PDSCH). In some cases, the network entity 105-*a* may use the difference report 235 to adjust a CQI reported from the UE 115-*a*. For example, if the network entity 105-*a* receives a CQI from the UE 115-*a*, and subsequently receives a difference report 235, the network entity 105-*a* may determine to adjust the reported CQI to account for the difference report 235 (e.g., the network entity 105-*a* may determine that a true CQI is actually lower than the reported CQI based on the difference report 235). Accordingly, the network entity 105-*a* may transmit signaling to assign the UE 115-*a* one or more adjusted communication parameters, such as an MCS (e.g., increase or decrease an MCS for an uplink transmission, a downlink transmission, or both), a quantity of MIMO layers (e.g., increase or decrease a quantity of spatial layers to use for a PUSCH transmission, a PDSCH transmission, or both), or both, to reduce a BLER observed in the network (e.g., to avoid a high BLER percentage on PDSCH).

Figure 3:
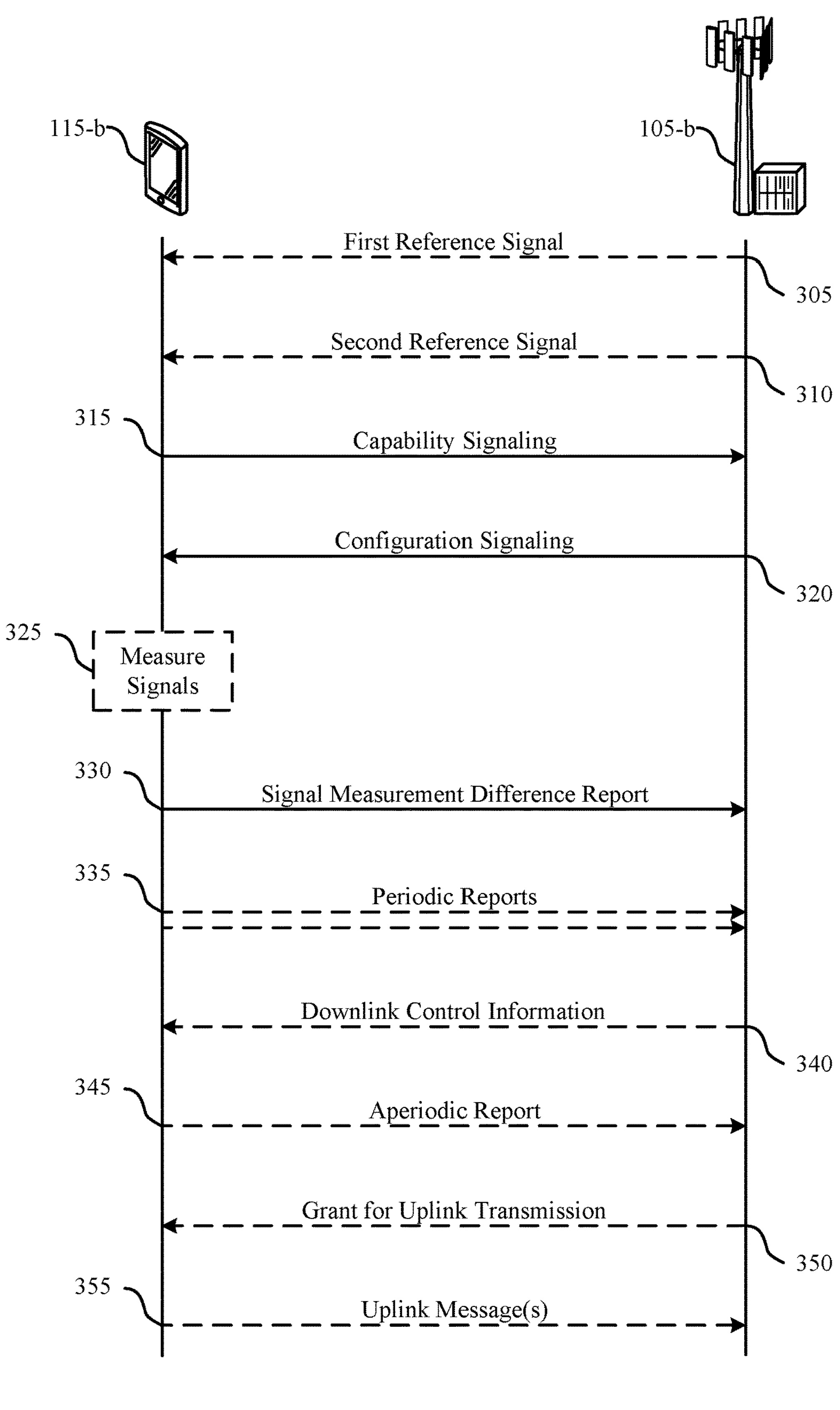
FIG. 3 shows an example of a process flow that supports signal measurement difference reporting in accordance with one or more aspects of the present disclosure.

FIG. 3 shows an example of a process flow 300 that supports signal measurement difference reporting in accordance with one or more aspects of the present disclosure. The process flow 300 includes a UE 115-*b* and a network entity 105-*b* which may be examples of the corresponding devices as described with respect to FIGS. 1 and 2. In the following description of the process flow 300, the operations between the UE 115-*b* and the network entity 105-*b* may be performed in a different order than the example order shown. Some operations may also be omitted from the process flow 300, and other operations may be added to the process flow 300. Further, although some operations or signaling may be shown to occur at different times for discussion purposes, these operations may actually occur at the same time.

At 305, the UE 115-*b* may receive, from the network entity 105-*b* a first reference signal. The first reference signal may be an example of a CSI-RS or another reference signal. At 310, the UE 115-*b* may receive, from the network entity 105-*b*, a second reference signal of a channel (e.g., a PDSCH). The second reference signal may be an example of a DMRS or another similar reference signal.

At 315, the UE 115-*b* may transmit, to the network entity 105-*b*, capability signaling that indicates that the UE 115-*b* supports measuring multiple signals (e.g., the first reference signal and the second reference signal) and reporting a difference between signal measurements corresponding to the multiple signals. The signal measurements may include an SINR, a spectral efficiency value, or both.

At 320, the UE 115-*b* may receive, from the network entity 105-*b* and based on the capability signaling, configuration signaling that enables reporting the difference between the signal measurements. The configuration signaling may further indicate a threshold measurement difference and a threshold time duration that are both associated with reporting the difference between the signal measurements. In some cases, the UE may receive a radio resource control reconfiguration message. The configuration signaling may be an example of the radio resource control reconfiguration message. Thus, the radio resource control reconfiguration message may enable the reporting and may indicate the threshold measurement difference and the threshold time duration.

At 325, the UE 115-*b* may measure one or more reference signals, such as the first reference signal and the second reference signal, to obtain the signal measurements. In some cases, the UE 115-*b* may measure the first reference signal at a first time and may measure the second reference signal at a second time (e.g., after measuring the second reference signal). In some examples, the UE 115-*b* may measure the first reference signal and the second reference signal in parallel. In any case, the UE 115-*b* may determine the difference between the signal measurements based on measuring the signal measurements and performing one or more arithmetic operations on the signal measurements. For example, the UE 115-*a* may subtract a first signal measurement value from a second signal measurement value. In some cases, the UE 115-*a* may obtain a magnitude of the result of the subtraction (e.g., by calculating an absolute value of the difference). In some examples, the magnitude, or the result of the subtraction, may be a value corresponding to the difference between the signal measurements.

At 330, the UE 115-*b* may transmit, to the network entity 105-*b* and based on the difference between the signal measurements satisfying the threshold measurement difference for a time duration that satisfies the threshold time duration, a report that indicates the difference between the signal measurements. In some cases, the report may include a field of one or more bits for indicating the difference between the signal measurements. The UE 115-*b* may transmit the report via a CSI message (e.g., via one or more bits of the CSI message) and via a PUCCH or a PUSCH. In some examples, the UE may transmit the report using a MAC-CE via a PUSCH.

At 335, the UE 115-*b* may transmit multiple reports in accordance with a periodicity that is based at least in part on the configuration signaling. In some cases, the multiple reports each may indicate a respective difference between respective signal measurements. In other words, the UE 115-*b* may transmit periodic CSIs, where each periodic CSI includes a corresponding difference between a set of signal measurements (e.g., a respective CSI-RS and a respective DMRS).

At 340, the UE 115-*b* may receive, based on a BLER (e.g., a PDSCH BLER) satisfying a BLER threshold, a DCI message that indicates that the UE 115-*b* is to report the difference between the signal measurements. Additionally or alternatively, at 345, the UE 115-*b* may transmit an aperiodic report based on the DCI message. In some cases, the aperiodic report may be an example of the report that indicates the difference between the signal measurements. Thus, in some examples, the UE 115-*b* may transmit the report without respect to a periodicity.

At 350, the UE 115-*b* may receive, based on the report that indicates the difference between the signal measurements, a downlink grant that indicates an adjustment to one or more transmission parameters, such as an adjustment to an MCS for downlink transmission (e.g., PDSCH transmission), or an adjustment to a quantity of layers to use for PDSCH transmission (or other downlink transmission), or both. At 355, the UE 115-*b* may transmit one or more uplink messages based on the adjusted one or more transmission parameters. Similarly, the UE 115-*b* may receive one or more downlink messages based on the adjusted one or more transmission parameters.

Figure 4:
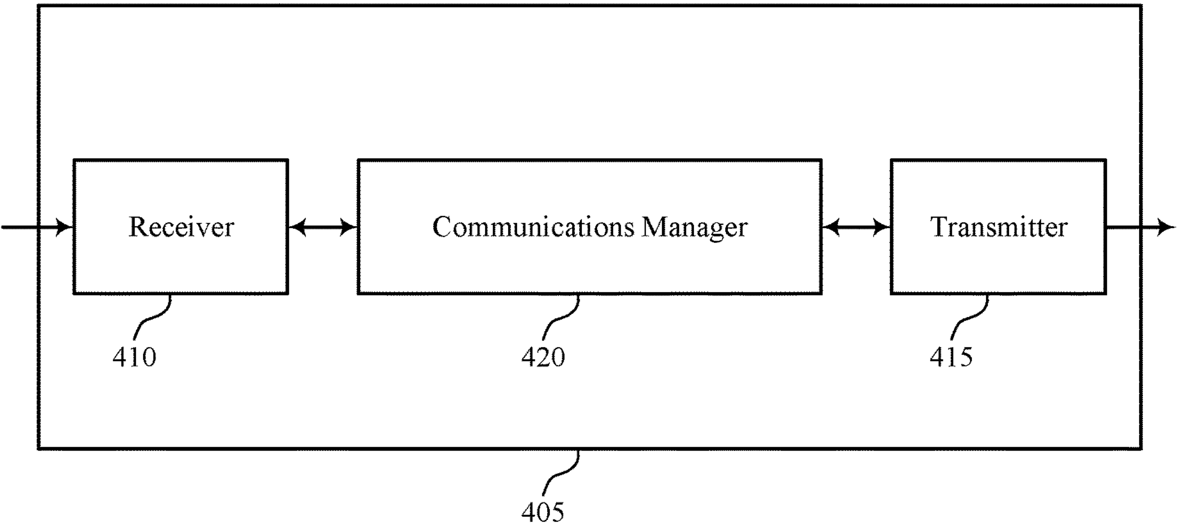
FIGS. 4 and 5 show block diagrams of devices that support signal measurement difference reporting in accordance with one or more aspects of the present disclosure.

FIG. 4 shows a block diagram 400 of a device 405 that supports signal measurement difference reporting in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to signal measurement difference reporting). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to signal measurement difference reporting). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of signal measurement difference reporting as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for transmitting capability signaling that indicates that the wireless device supports measuring a set of multiple signals and reporting a difference between signal measurements corresponding to the set of multiple signals. The communications manager 420 is capable of, configured to, or operable to support a means for receiving, based on the capability signaling, configuration signaling that enables reporting the difference between the signal measurements, the configuration signaling further indicating a threshold measurement difference and a threshold time duration that are both associated with reporting the difference between the signal measurements. The communications manager 420 is capable of, configured to, or operable to support a means for transmitting, based on the difference between the signal measurements satisfying the threshold measurement difference for a time duration that satisfies the threshold time duration, a report that indicates the difference between the signal measurements.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for signal measurement difference reporting, which may result in reduced excess processing, reduced power consumption, more efficient utilization of communication resources at a network entity 105 and a UE 115, among other advantages.

Figure 5:
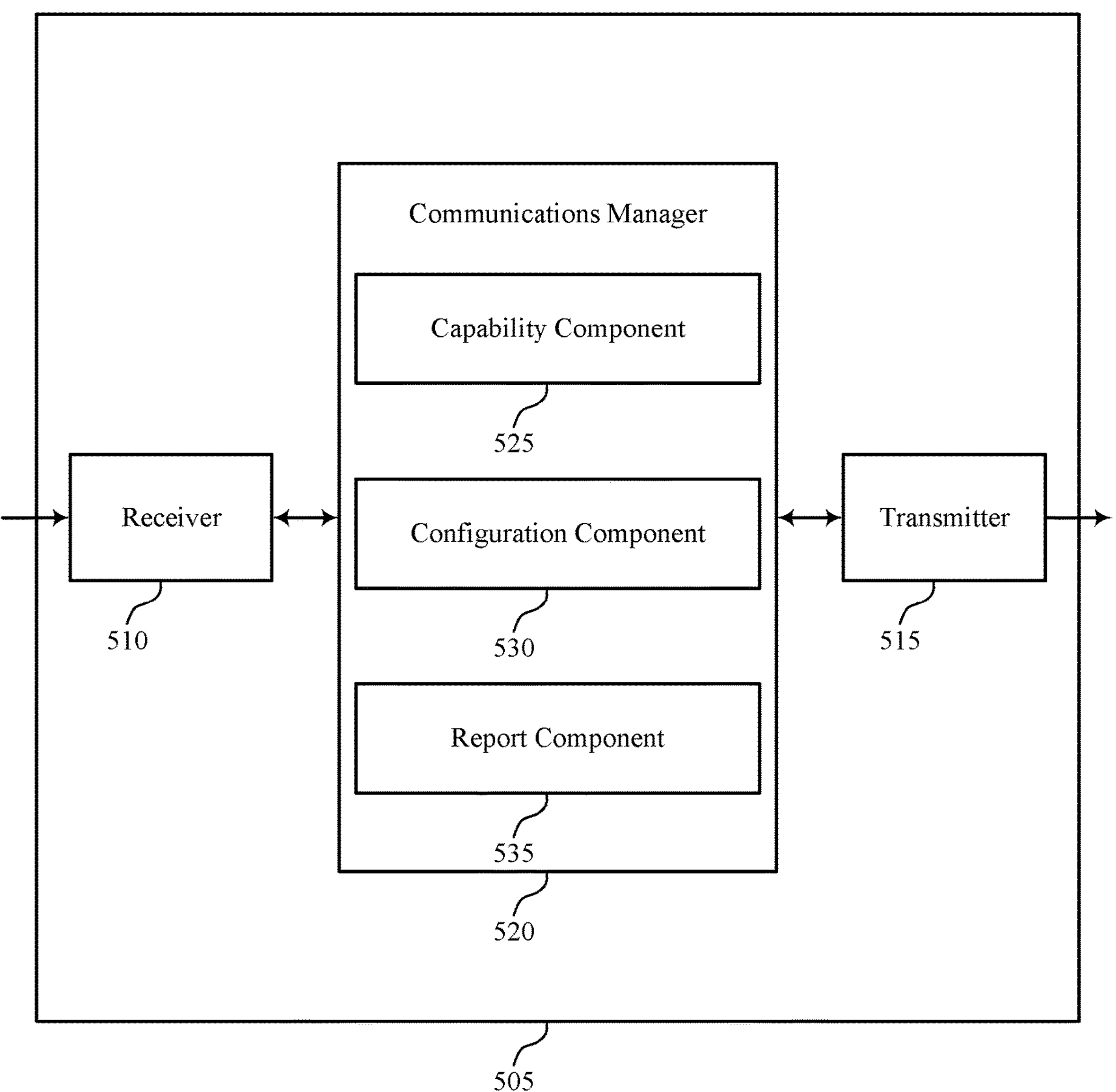

FIG. 5 shows a block diagram 500 of a device 505 that supports signal measurement difference reporting in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to signal measurement difference reporting). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to signal measurement difference reporting). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of signal measurement difference reporting as described herein. For example, the communications manager 520 may include a capability component 525, a configuration component 530, a report component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The capability component 525 is capable of, configured to, or operable to support a means for transmitting capability signaling that indicates that the wireless device supports measuring a set of multiple signals and reporting a difference between signal measurements corresponding to the set of multiple signals. The configuration component 530 is capable of, configured to, or operable to support a means for receiving, based on the capability signaling, configuration signaling that enables reporting the difference between the signal measurements, the configuration signaling further indicating a threshold measurement difference and a threshold time duration that are both associated with reporting the difference between the signal measurements. The report component 535 is capable of, configured to, or operable to support a means for transmitting, based on the difference between the signal measurements satisfying the threshold measurement difference for a time duration that satisfies the threshold time duration, a report that indicates the difference between the signal measurements.

Figure 6:
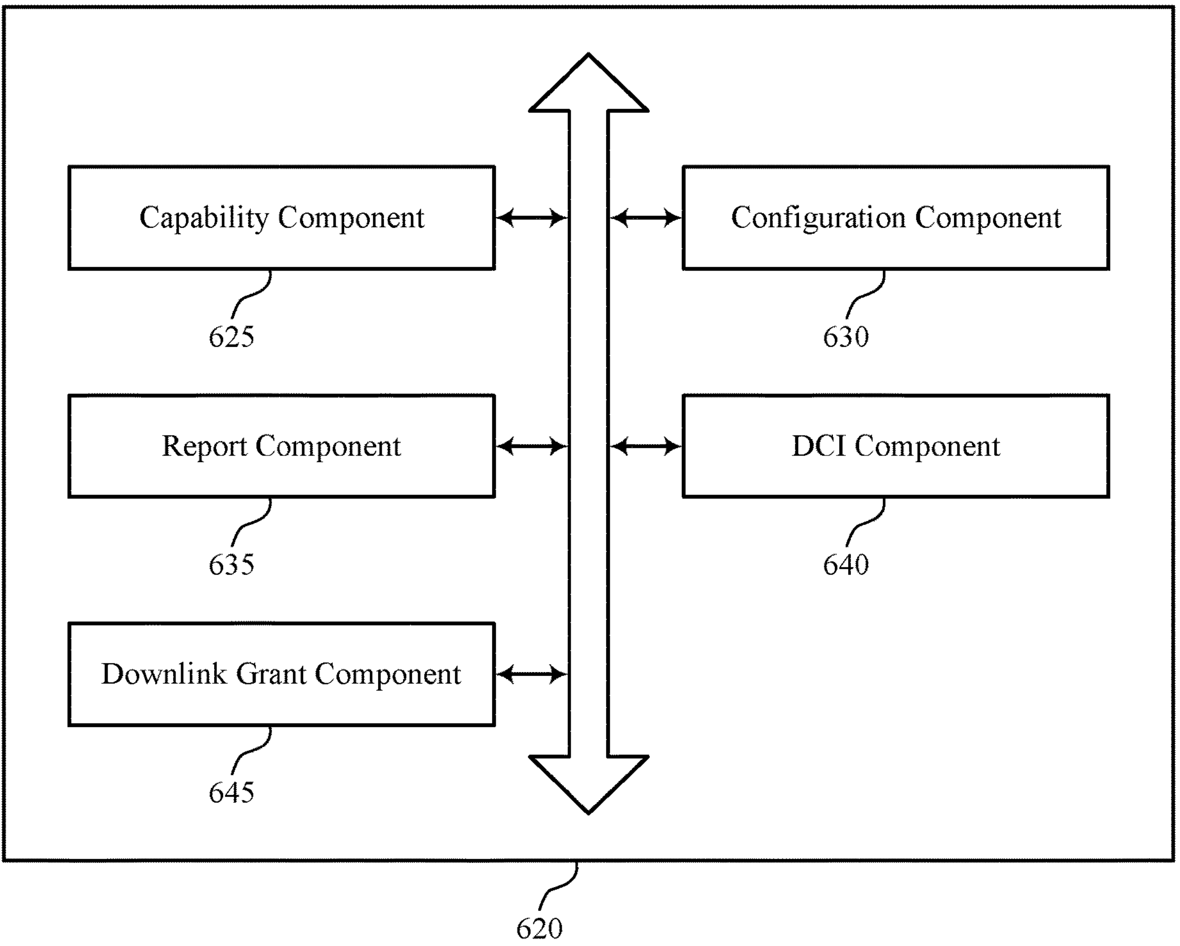
FIG. 6 shows a block diagram of a communications manager that supports signal measurement difference reporting in accordance with one or more aspects of the present disclosure.

FIG. 6 shows a block diagram 600 of a communications manager 620 that supports signal measurement difference reporting in accordance with one or more aspects of the present disclosure. The communications manager 620 may be an example of aspects of a communications manager 420, a communications manager 520, or both, as described herein. The communications manager 620, or various components thereof, may be an example of means for performing various aspects of signal measurement difference reporting as described herein. For example, the communications manager 620 may include a capability component 625, a configuration component 630, a report component 635, a DCI component 640, a downlink grant component 645, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The capability component 625 is capable of, configured to, or operable to support a means for transmitting capability signaling that indicates that the wireless device supports measuring a set of multiple signals and reporting a difference between signal measurements corresponding to the set of multiple signals. The configuration component 630 is capable of, configured to, or operable to support a means for receiving, based on the capability signaling, configuration signaling that enables reporting the difference between the signal measurements, the configuration signaling further indicating a threshold measurement difference and a threshold time duration that are both associated with reporting the difference between the signal measurements. The report component 635 is capable of, configured to, or operable to support a means for transmitting, based on the difference between the signal measurements satisfying the threshold measurement difference for a time duration that satisfies the threshold time duration, a report that indicates the difference between the signal measurements.

In some examples, the report component 635 is capable of, configured to, or operable to support a means for transmitting a set of multiple reports, each indicating a respective difference between respective signal measurements, in accordance with a periodicity that is based on the configuration signaling.

In some examples, the DCI component 640 is capable of, configured to, or operable to support a means for receiving, based on a PDSCH BLER satisfying a BLER threshold, a DCI message that indicates that the wireless device is to report the difference between the signal measurements, where transmitting the report is further based on the DCI message.

In some examples, the downlink grant component 645 is capable of, configured to, or operable to support a means for receiving, based on the report that indicates the difference between the signal measurements, a downlink grant that indicates an adjustment to an MCS for PDSCH transmission, or an adjustment to a quantity of layers to use for PDSCH transmission, or both.

In some examples, to support transmitting the report, the report component 635 is capable of, configured to, or operable to support a means for transmitting the report that includes a field of one or more bits for indicating the difference between the signal measurements.

In some examples, to support transmitting the report, the report component 635 is capable of, configured to, or operable to support a means for transmitting the report via a CSI message and via a PUCCH or a PUSCH.

In some examples, to support transmitting the report, the report component 635 is capable of, configured to, or operable to support a means for transmitting the report using a MAC-CE via a PUSCH.

In some examples, to support receiving the configuration signaling, the configuration component 630 is capable of, configured to, or operable to support a means for receiving a radio resource control reconfiguration message.

In some examples, the set of multiple signals include a DMRS of a PDSCH, or a CSI-RS, or a combination thereof.

In some examples, the signal measurements include an SINR, a spectral efficiency value, or both.

Figure 7:
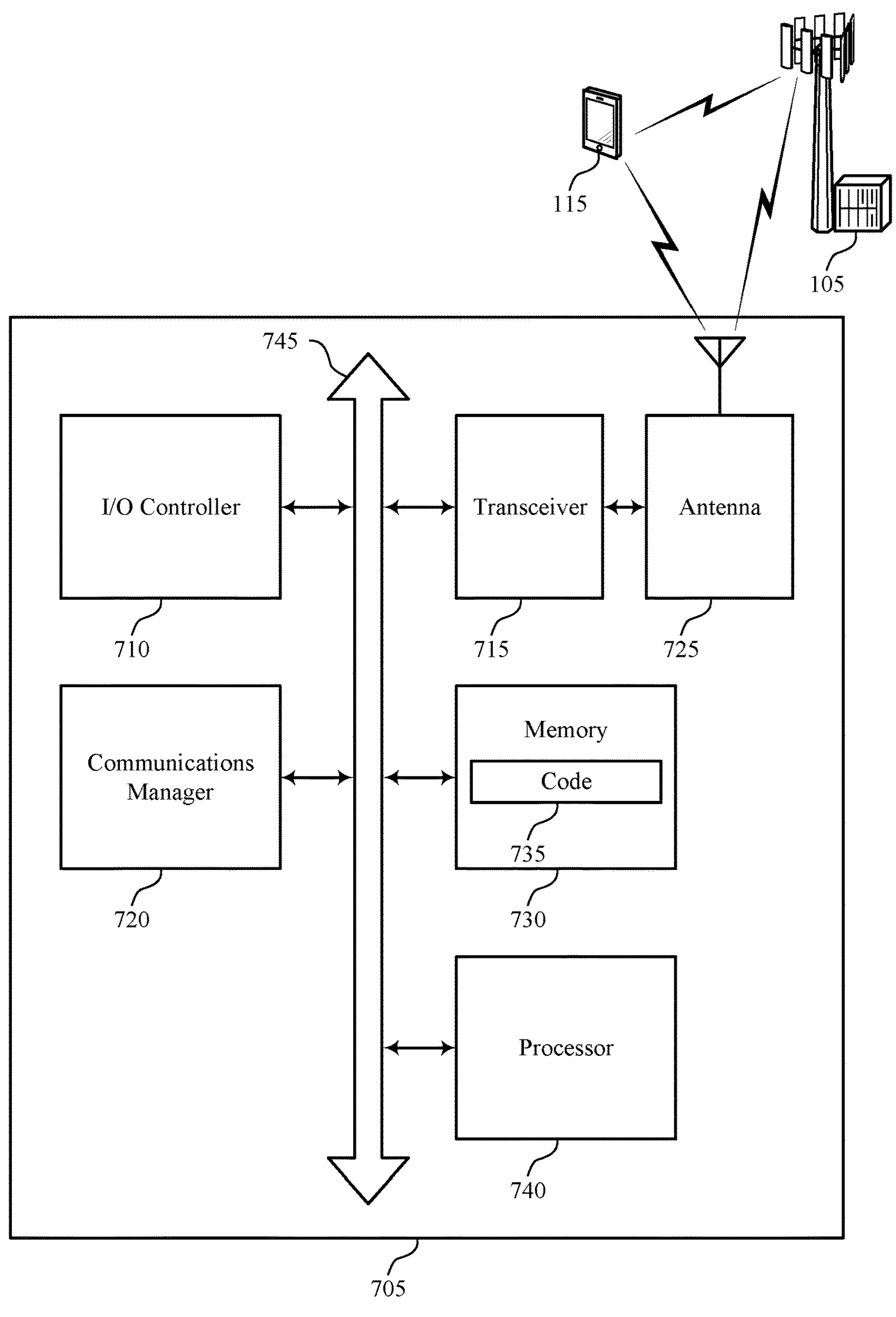
FIG. 7 shows a diagram of a system including a device that supports signal measurement difference reporting in accordance with one or more aspects of the present disclosure.

FIG. 7 shows a diagram of a system 700 including a device 705 that supports signal measurement difference reporting in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting signal measurement difference reporting). For example, the device 705 or a component of the device 705 may include at least one processor 740 and at least one memory 730 coupled with or to the at least one processor 740, the at least one processor 740 and the at least one memory 730 configured to perform various functions described herein.

In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for transmitting capability signaling that indicates that the wireless device supports measuring a set of multiple signals and reporting a difference between signal measurements corresponding to the set of multiple signals. The communications manager 720 is capable of, configured to, or operable to support a means for receiving, based on the capability signaling, configuration signaling that enables reporting the difference between the signal measurements, the configuration signaling further indicating a threshold measurement difference and a threshold time duration that are both associated with reporting the difference between the signal measurements. The communications manager 720 is capable of, configured to, or operable to support a means for transmitting, based on the difference between the signal measurements satisfying the threshold measurement difference for a time duration that satisfies the threshold time duration, a report that indicates the difference between the signal measurements.

By including or configuring the communications manager 720 in accordance with examples as described herein, the device 705 may support techniques for signal measurement difference reporting, which may result in improved communication reliability by improving throughput and increasing data transfer, reduced latency, improved user experience related to reduced processing, reduced power consumption, more efficient utilization of communication resources, improved coordination between devices, improved utilization of processing capability, among other advantages.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of signal measurement difference reporting as described herein, or the at least one processor 740 and the at least one memory 730 may be otherwise configured to, individually or collectively, perform or support such operations.

Figure 8:
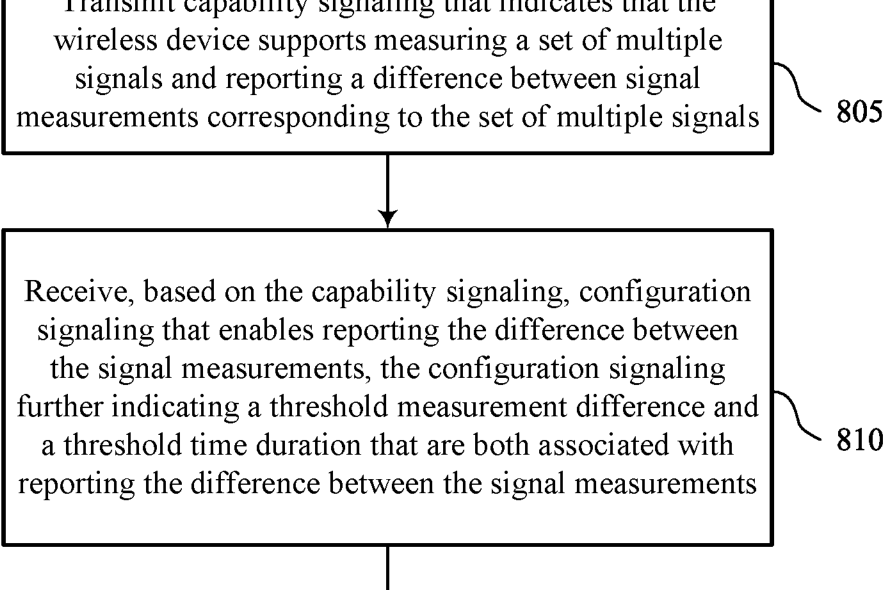
FIGS. 8 through 11 show flowcharts illustrating methods that support signal measurement difference reporting in accordance with one or more aspects of the present disclosure.

FIG. 8 shows a flowchart illustrating a method 800 that supports signal measurement difference reporting in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include transmitting capability signaling that indicates that the wireless device supports measuring a set of multiple signals and reporting a difference between signal measurements corresponding to the set of multiple signals. The operations of 805 may be performed in accordance with examples as disclosed herein. In some examples, aspects of the operations of 805 may be performed by a capability component 625 as described with reference to FIG. 6.

At 810, the method may include receiving, based on the capability signaling, configuration signaling that enables reporting the difference between the signal measurements, the configuration signaling further indicating a threshold measurement difference and a threshold time duration that are both associated with reporting the difference between the signal measurements. The operations of 810 may be performed in accordance with examples as disclosed herein. In some examples, aspects of the operations of 810 may be performed by a configuration component 630 as described with reference to FIG. 6.

At 815, the method may include transmitting, based on the difference between the signal measurements satisfying the threshold measurement difference for a time duration that satisfies the threshold time duration, a report that indicates the difference between the signal measurements. The operations of 815 may be performed in accordance with examples as disclosed herein. In some examples, aspects of the operations of 815 may be performed by a report component 635 as described with reference to FIG. 6.

Figure 9:
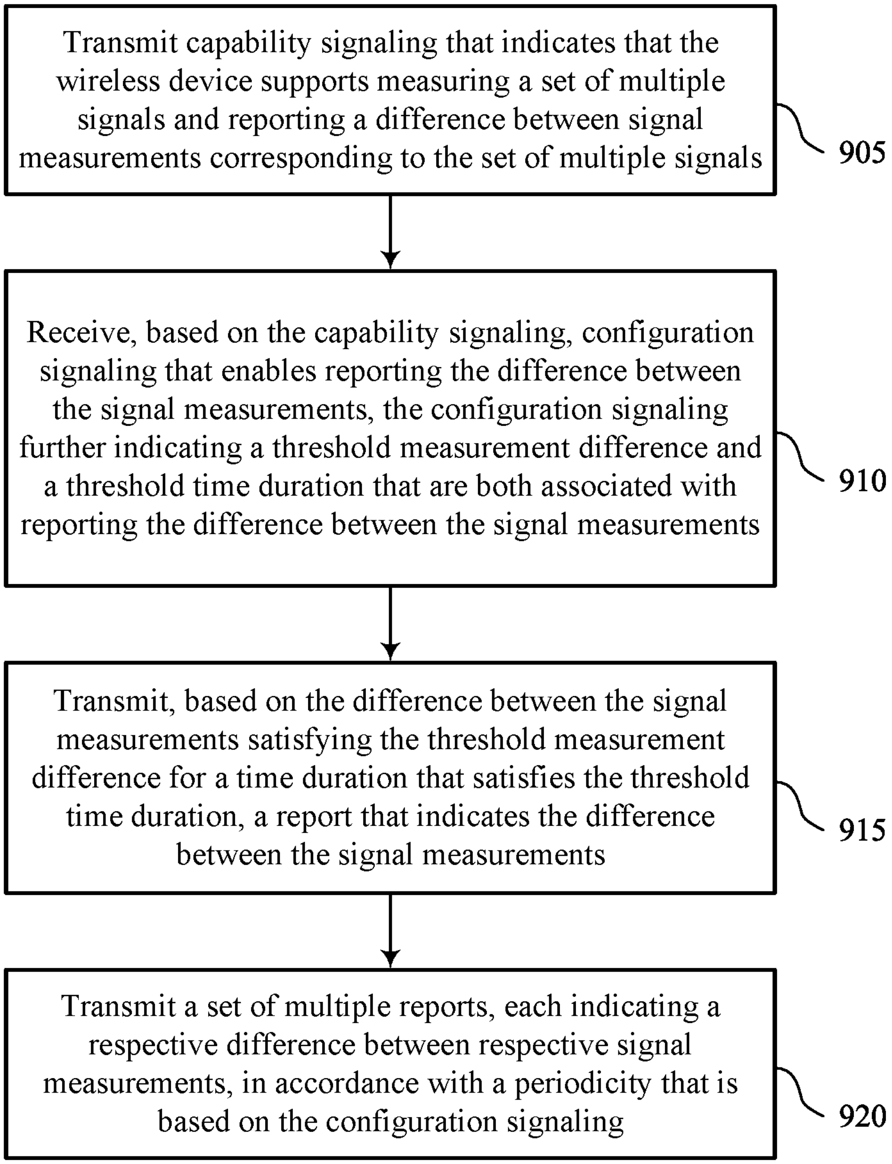

FIG. 9 shows a flowchart illustrating a method 900 that supports signal measurement difference reporting in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include transmitting capability signaling that indicates that the wireless device supports measuring a set of multiple signals and reporting a difference between signal measurements corresponding to the set of multiple signals. The operations of 905 may be performed in accordance with examples as disclosed herein. In some examples, aspects of the operations of 905 may be performed by a capability component 625 as described with reference to FIG. 6.

At 910, the method may include receiving, based on the capability signaling, configuration signaling that enables reporting the difference between the signal measurements, the configuration signaling further indicating a threshold measurement difference and a threshold time duration that are both associated with reporting the difference between the signal measurements. The operations of 910 may be performed in accordance with examples as disclosed herein. In some examples, aspects of the operations of 910 may be performed by a configuration component 630 as described with reference to FIG. 6.

At 915, the method may include transmitting, based on the difference between the signal measurements satisfying the threshold measurement difference for a time duration that satisfies the threshold time duration, a report that indicates the difference between the signal measurements. The operations of 915 may be performed in accordance with examples as disclosed herein. In some examples, aspects of the operations of 915 may be performed by a report component 635 as described with reference to FIG. 6.

At 920, the method may include transmitting a set of multiple reports, each indicating a respective difference between respective signal measurements, in accordance with a periodicity that is based on the configuration signaling. The operations of 920 may be performed in accordance with examples as disclosed herein. In some examples, aspects of the operations of 920 may be performed by a report component 635 as described with reference to FIG. 6.

Figure 10:
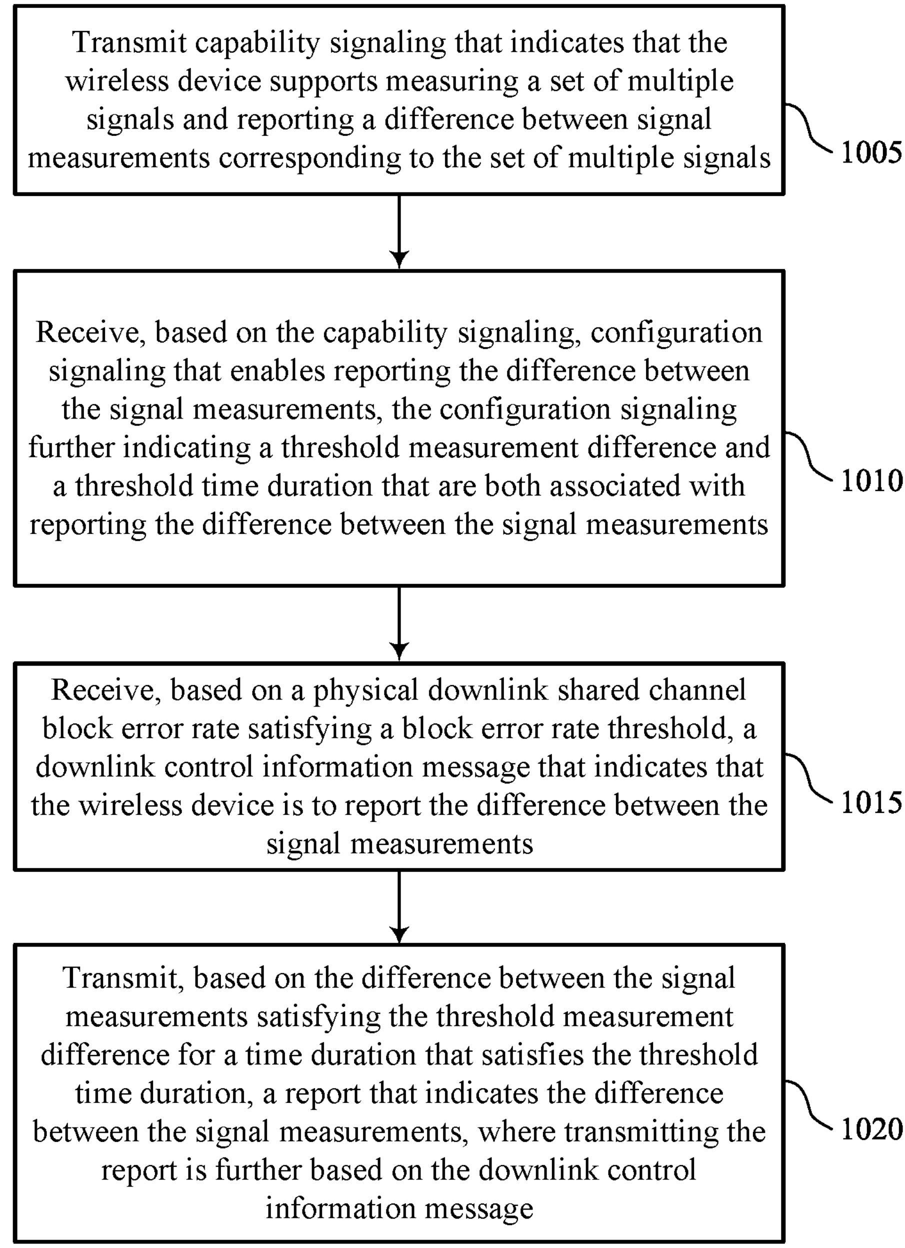

FIG. 10 shows a flowchart illustrating a method 1000 that supports signal measurement difference reporting in accordance with one or more aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1005, the method may include transmitting capability signaling that indicates that the wireless device supports measuring a set of multiple signals and reporting a difference between signal measurements corresponding to the set of multiple signals. The operations of 1005 may be performed in accordance with examples as disclosed herein. In some examples, aspects of the operations of 1005 may be performed by a capability component 625 as described with reference to FIG. 6.

At 1010, the method may include receiving, based on the capability signaling, configuration signaling that enables reporting the difference between the signal measurements, the configuration signaling further indicating a threshold measurement difference and a threshold time duration that are both associated with reporting the difference between the signal measurements. The operations of 1010 may be performed in accordance with examples as disclosed herein. In some examples, aspects of the operations of 1010 may be performed by a configuration component 630 as described with reference to FIG. 6.

At 1015, the method may include receiving, based on a PDSCH BLER satisfying a BLER threshold, a DCI message that indicates that the wireless device is to report the difference between the signal measurements. The operations of 1015 may be performed in accordance with examples as disclosed herein. In some examples, aspects of the operations of 1015 may be performed by a DCI component 640 as described with reference to FIG. 6.

At 1020, the method may include transmitting, based on the difference between the signal measurements satisfying the threshold measurement difference for a time duration that satisfies the threshold time duration, a report that indicates the difference between the signal measurements, where transmitting the report is further based on the DCI message. The operations of 1020 may be performed in accordance with examples as disclosed herein. In some examples, aspects of the operations of 1020 may be performed by a report component 635 as described with reference to FIG. 6.

Figure 11:
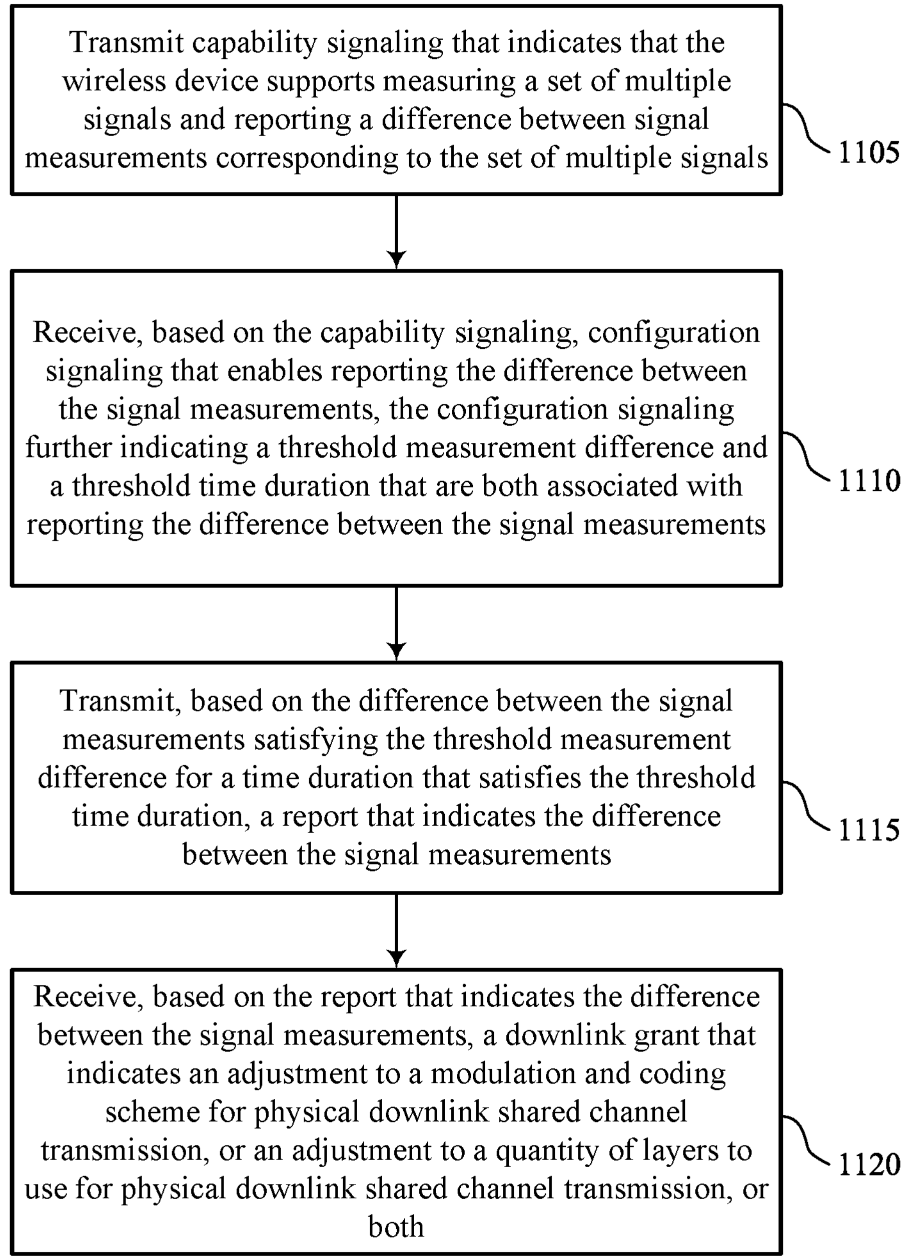

FIG. 11 shows a flowchart illustrating a method 1100 that supports signal measurement difference reporting in accordance with one or more aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1105, the method may include transmitting capability signaling that indicates that the wireless device supports measuring a set of multiple signals and reporting a difference between signal measurements corresponding to the set of multiple signals. The operations of 1105 may be performed in accordance with examples as disclosed herein. In some examples, aspects of the operations of 1105 may be performed by a capability component 625 as described with reference to FIG. 6.

At 1110, the method may include receiving, based on the capability signaling, configuration signaling that enables reporting the difference between the signal measurements, the configuration signaling further indicating a threshold measurement difference and a threshold time duration that are both associated with reporting the difference between the signal measurements. The operations of 1110 may be performed in accordance with examples as disclosed herein. In some examples, aspects of the operations of 1110 may be performed by a configuration component 630 as described with reference to FIG. 6.

At 1115, the method may include transmitting, based on the difference between the signal measurements satisfying the threshold measurement difference for a time duration that satisfies the threshold time duration, a report that indicates the difference between the signal measurements. The operations of 1115 may be performed in accordance with examples as disclosed herein. In some examples, aspects of the operations of 1115 may be performed by a report component 635 as described with reference to FIG. 6.

At 1120, the method may include receiving, based on the report that indicates the difference between the signal measurements, a downlink grant that indicates an adjustment to a MCS for PDSCH transmission, or an adjustment to a quantity of layers to use for PDSCH transmission, or both. The operations of 1120 may be performed in accordance with examples as disclosed herein. In some examples, aspects of the operations of 1120 may be performed by a downlink grant component 645 as described with reference to FIG. 6.

The following provides an overview of aspects of the present disclosure:

Aspect 1: A method for wireless communications at a wireless device, comprising: transmitting capability signaling that indicates that the wireless device supports measuring a plurality of signals and reporting a difference between signal measurements corresponding to the plurality of signals; receiving, based at least in part on the capability signaling, configuration signaling that enables reporting the difference between the signal measurements, the configuration signaling further indicating a threshold measurement difference and a threshold time duration that are both associated with reporting the difference between the signal measurements; and transmitting, based at least in part on the difference between the signal measurements satisfying the threshold measurement difference for a time duration that satisfies the threshold time duration, a report that indicates the difference between the signal measurements.

Aspect 2: The method of aspect 1, further comprising: transmitting a plurality of reports, each indicating a respective difference between respective signal measurements, in accordance with a periodicity that is based at least in part on the configuration signaling.

Aspect 3: The method of any of aspects 1 through 2, further comprising: receiving, based at least in part on a PDSCH BLER satisfying a BLER threshold, a DCI message that indicates that the wireless device is to report the difference between the signal measurements, wherein transmitting the report is further based at least in part on the DCI message.

Aspect 4: The method of any of aspects 1 through 3, further comprising: receiving, based at least in part on the report that indicates the difference between the signal measurements, a downlink grant that indicates an adjustment to a MCS for PDSCH transmission, or an adjustment to a quantity of layers to use for PDSCH transmission, or both.

Aspect 5: The method of any of aspects 1 through 4, wherein transmitting the report further comprises: transmitting the report that includes a field of one or more bits for indicating the difference between the signal measurements.

Aspect 6: The method of any of aspects 1 through 5, wherein transmitting the report further comprises: transmitting the report via a CSI message and via a PUCCH or a PUSCH.

Aspect 7: The method of any of aspects 1 through 6, wherein transmitting the report further comprises: transmitting the report using a MAC-CE via a PUSCH.

Aspect 8: The method of any of aspects 1 through 7, wherein receiving the configuration signaling comprises: receiving a radio resource control reconfiguration message.

Aspect 9: The method of any of aspects 1 through 8, wherein the plurality of signals comprise a DMRS of a PDSCH, or a CSI-RS, or a combination thereof.

Aspect 10: The method of any of aspects 1 through 9, wherein the signal measurements comprise a SINR, a spectral efficiency value, or both.

Aspect 11: A wireless device for wireless communications, comprising one or more memories storing processor-executable code, and one or more processors coupled with the one or more memories and individually or collectively operable to execute the code to cause the wireless device to perform a method of any of aspects 1 through 10.

Aspect 12: A wireless device for wireless communications, comprising at least one means for performing a method of any of aspects 1 through 10.

Aspect 13: A non-transitory computer-readable medium storing code for wireless communications, the code comprising instructions executable by one or more processors to perform a method of any of aspects 1 through 10.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device, comprising:

one or more memories storing processor-executable code; and one or more processors coupled with the one or more memories and individually or collectively operable to execute the code to cause the wireless device to:

transmit capability signaling that indicates that the wireless device supports measuring a plurality of signals and reporting a difference between signal measurements corresponding to the plurality of signals;

receive, based at least in part on the capability signaling, configuration signaling that enables reporting the difference between the signal measurements, the configuration signaling further indicating a threshold measurement difference and a threshold time duration that are both associated with reporting the difference between the signal measurements; and transmit, based at least in part on the difference between the signal measurements satisfying the threshold measurement difference for a time duration that satisfies the threshold time duration, a report that indicates the difference between the signal measurements.

2. The wireless device of claim 1, wherein the one or more processors are individually or collectively further operable to execute the code to cause the wireless device to:

transmit a plurality of reports, each indicating a respective difference between respective signal measurements, in accordance with a periodicity that is based at least in part on the configuration signaling.

3. The wireless device of claim 1, wherein the one or more processors are individually or collectively further operable to execute the code to cause the wireless device to:

receive, based at least in part on a physical downlink shared channel block error rate satisfying a block error rate threshold, a downlink control information message that indicates that the wireless device is to report the difference between the signal measurements, wherein transmitting the report is further based at least in part on the downlink control information message.

4. The wireless device of claim 1, wherein the one or more processors are individually or collectively further operable to execute the code to cause the wireless device to:

receive, based at least in part on the report that indicates the difference between the signal measurements, a downlink grant that indicates an adjustment to a modulation and coding scheme for physical downlink shared channel transmission, or an adjustment to a quantity of layers to use for physical downlink shared channel transmission, or both.

5. The wireless device of claim 1, wherein, to transmit the report, the one or more processors are individually or collectively further operable to execute the code to cause the wireless device to:

transmit the report that includes a field of one or more bits for indicating the difference between the signal measurements.

6. The wireless device of claim 1, wherein, to transmit the report, the one or more processors are individually or collectively further operable to execute the code to cause the wireless device to:

transmit the report via a channel state information message and via a physical uplink control channel or a physical uplink shared channel.

7. The wireless device of claim 1, wherein, to transmit the report, the one or more processors are individually or collectively further operable to execute the code to cause the wireless device to:

transmit the report using a medium access control-control element via a physical uplink shared channel.

8. The wireless device of claim 1, wherein, to receive the configuration signaling, the one or more processors are individually or collectively operable to execute the code to cause the wireless device to:

receive a radio resource control reconfiguration message.

9. The wireless device of claim 1, wherein the plurality of signals comprise a demodulation reference signal of a physical downlink shared channel, or a channel state information reference signal, or a combination thereof.

10. The wireless device of claim 1, wherein the signal measurements comprise a signal-to-interference-and-noise ratio, a spectral efficiency value, or both.

11. A method for wireless communications at a wireless device, comprising:

transmitting capability signaling that indicates that the wireless device supports measuring a plurality of signals and reporting a difference between signal measurements corresponding to the plurality of signals;

receiving, based at least in part on the capability signaling, configuration signaling that enables reporting the difference between the signal measurements, the configuration signaling further indicating a threshold measurement difference and a threshold time duration that are both associated with reporting the difference between the signal measurements; and transmitting, based at least in part on the difference between the signal measurements satisfying the threshold measurement difference for a time duration that satisfies the threshold time duration, a report that indicates the difference between the signal measurements.

12. The method of claim 11, further comprising:

transmitting a plurality of reports, each indicating a respective difference between respective signal measurements, in accordance with a periodicity that is based at least in part on the configuration signaling.

13. The method of claim 11, further comprising:

receiving, based at least in part on a physical downlink shared channel block error rate satisfying a block error rate threshold, a downlink control information message that indicates that the wireless device is to report the difference between the signal measurements, wherein transmitting the report is further based at least in part on the downlink control information message.

14. The method of claim 11, further comprising:

receiving, based at least in part on the report that indicates the difference between the signal measurements, a downlink grant that indicates an adjustment to a modulation and coding scheme for physical downlink shared channel transmission, or an adjustment to a quantity of layers to use for physical downlink shared channel transmission, or both.

15. The method of claim 11, wherein transmitting the report further comprises:

transmitting the report that includes a field of one or more bits for indicating the difference between the signal measurements.

16. The method of claim 11, wherein transmitting the report further comprises:

transmitting the report via a channel state information message and via a physical uplink control channel or a physical uplink shared channel.

17. A non-transitory computer-readable medium storing code for wireless communications at a wireless device, the code comprising instructions executable by one or more processors to:

transmit capability signaling that indicates that the wireless device supports measuring a plurality of signals and reporting a difference between signal measurements corresponding to the plurality of signals;

receive, based at least in part on the capability signaling, configuration signaling that enables reporting the difference between the signal measurements, the configuration signaling further indicating a threshold measurement difference and a threshold time duration that are both associated with reporting the difference between the signal measurements; and transmit, based at least in part on the difference between the signal measurements satisfying the threshold measurement difference for a time duration that satisfies the threshold time duration, a report that indicates the difference between the signal measurements.

18. The non-transitory computer-readable medium of claim 17, wherein the instructions are further executable by the one or more processors to:

transmit a plurality of reports, each indicating a respective difference between respective signal measurements, in accordance with a periodicity that is based at least in part on the configuration signaling.

19. The non-transitory computer-readable medium of claim 17, wherein the instructions are further executable by the one or more processors to:

receive, based at least in part on a physical downlink shared channel block error rate satisfying a block error rate threshold, a downlink control information message that indicates that the wireless device is to report the difference between the signal measurements, wherein transmitting the report is further based at least in part on the downlink control information message.

20. The non-transitory computer-readable medium of claim 17, wherein the instructions are further executable by the one or more processors to:

receive, based at least in part on the report that indicates the difference between the signal measurements, a downlink grant that indicates an adjustment to a modulation and coding scheme for physical downlink shared channel transmission, or an adjustment to a quantity of layers to use for physical downlink shared channel transmission, or both.

* * * * *